US011470567B2

(12) United States Patent
Joseph et al.

(10) Patent No.: US 11,470,567 B2
(45) Date of Patent: Oct. 11, 2022

(54) NETWORK TIMING REFERENCE SYNCHRONIZATION

(71) Applicant: QUALCOMM Incorporated, San Diego, CA (US)

(72) Inventors: Vinay Joseph, Calicut (IN); Rajat Prakash, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/950,571

(22) Filed: Nov. 17, 2020

(65) Prior Publication Data

US 2021/0153152 A1    May 20, 2021

Related U.S. Application Data

(60) Provisional application No. 62/937,002, filed on Nov. 18, 2019.

(51) Int. Cl.
*H04W 4/00*        (2018.01)
*H04W 56/00*       (2009.01)
(Continued)

(52) U.S. Cl.
CPC ..... *H04W 56/0015* (2013.01); *H04W 72/005* (2013.01); *H04W 76/27* (2018.02)

(58) Field of Classification Search
CPC ........... H04W 56/0015; H04W 72/005; H04W 76/27; H04W 76/40

(Continued)

(56) References Cited

U.S. PATENT DOCUMENTS

| 10,772,055 B2 * | 9/2020 | Da ..................... H04W 56/002 |
| 2011/0296226 A1 * | 12/2011 | Sorbara ................ H04J 3/0685 |
| | | 713/400 |

(Continued)

FOREIGN PATENT DOCUMENTS

| WO | 2020093000 A1 | 5/2020 |
| WO | 2020145248 A1 | 7/2020 |

OTHER PUBLICATIONS

Huawei, et al., "Remaining Issues of Reference Time Delivery", 3GPP Draft, R2-1914775, 3GPP TSG-RAN WG2 Mtg 108, 3rd Generation Partnership Project (3GPP), Mobile Competence Centre, 650, Route Des Lucioles, F-06921 Sophia-Antipolis Cedex, FR, vol. RAN WG2. No. Reno, USA, Nov. 18, 2019-Nov. 22, 2019, Nov. 7, 2019 (Nov. 7, 2019), XP051815747, 5 Pages, Retrieved from Internet:URL:https://ftp.3gpp.org/tsg_ran/WG2_RL2/TSGR2_108/Docs/R2-1914775.zip,R2-1914775 Remaining issues of reference time delivery.doc[retrieved Nov. 7, 2019] Paragraph [2.2.2].

(Continued)

*Primary Examiner* — Chuong T Ho
(74) *Attorney, Agent, or Firm* — Muncy, Geissler, Olds & Lowe, P.C.

(57) ABSTRACT

In an aspect, a UE may perform clock synchronization in accordance with a first network timing reference, such as a unicast network timing reference (UNTR) or a broadcast networking timing reference (BNTR). The UE may detect event(s) associated with a connection to a BS, which may trigger a switch between the UNTR and the BNTR for clock synchronization. In a further aspect, a communications device (e.g., UE or BS) may determine to transition a UE between the BNTR and UNTR for clock synchronization, and may perform one or more actions to facilitate the network timing reference transition.

30 Claims, 12 Drawing Sheets

(51) Int. Cl.
*H04W 76/27* (2018.01)
*H04W 72/00* (2009.01)

(58) Field of Classification Search
USPC .................................................. 370/329, 330
See application file for complete search history.

(56) References Cited

U.S. PATENT DOCUMENTS

| | | | | |
|---|---|---|---|---|
| 2015/0280897 | A1* | 10/2015 | Kayama | H04J 3/0641 375/356 |
| 2018/0076515 | A1* | 3/2018 | Perlman | H04B 1/38 |
| 2018/0146442 | A1* | 5/2018 | Klatt | H04W 36/32 |
| 2019/0042525 | A1* | 2/2019 | McElrath | G06F 9/5077 |
| 2020/0351728 | A1* | 11/2020 | Chien | H04W 56/001 |
| 2021/0211215 | A1* | 7/2021 | Zhu | H04L 61/6022 |

OTHER PUBLICATIONS

International Search Report and Written Opinion—PCT/US2020/060966—ISA/EPO—dated Mar. 9, 2021.

ZTE Corporation, et al., "Signalling Aspects for Accurate Reference Timing Delivery in TSC", 3GPP Draft, R2-1912897,3GPP TSG-RAN WG2#107bis,Signalling Aspects for Accurate Reference Timing Delivery in TSC,3rd Gen Partnership Proj(3GPP)Mobile Comp Cntr,650,Route Des Lucioles,F-06921 Sophia-Antipolis Cedex,vol. RAN WG2,No. Chongqing,CN,Oct. 14, 2019-Oct. 18, 2019,Oct. 4, 2019(Oct. 4, 2019)XP051790931,7pgs,Retrieved from Internet:URL:http://www.3gpp.org/ftp/tsg_ran/WG2_RL2/TSGR2_107bis/Docs/R2-1912897.zip[Oct. 4, 2019]Para[0002]Para[0003].

ZTE Corporation, et al., "Other Issues Related to Accurate Reference Timing Delivery in TSC", 3GPP Draft, R2-1912898,3GPP TSG-RAN WG2#107Bis,Other Issues Related to Accurate Ref Timing Delivery in TSC,3rd Gen Partnership Project(3GPP)Mobile Comp Centre,650,Route Des Lucioles,F-06921 Sophia-Antipolis Cedex,vol. RAN WG2.No. Chongqing,CN,Oct. 14, 2019-Oct. 18, 2019,Oct. 4, 2019(Oct. 4, 2019)XP051790932,19 pg,Retrieved Internet:URL:http://www.3gpp.org/ftp/tsg_ran/WG2_RL2/TSGR2_107bis/Docs/R2-1912898.zip[Oct. 4, 2019]Para[0002]Para[0003].

* cited by examiner

NETWORK TIMING REFERENCE SYNCHRONIZATION

CROSS-REFERENCE TO RELATED APPLICATION

The present Application for Patent claims the benefit of U.S. Provisional Patent Application No. 62/937,002 entitled, "NETWORK TIMING REFERENCE SYNCHRONIZATION", filed Nov. 18, 2019, assigned to the assignee hereof and hereby expressly incorporated herein by reference in its entirety.

BACKGROUND OF THE DISCLOSURE

1. Field of the Disclosure

Aspects of the disclosure relate generally to wireless communications and to techniques and apparatuses related to network timing reference synchronization.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some systems, a UE may synchronize a local clock maintained at the UE with a network clock to facilitate end-to-end (e2e) clock synchronization. At the physical layer, base station(s) of a radio access network (RAN) may transmit reference timing signals which can be measured by the UE and used to perform the clock synchronization of its local clock. Various data traffic communications (e.g., generic Precision Time Protocol (gPTP) packets) may then be performed on a physical layer between the UE and the RAN based on the synchronized local clock.

In some systems, the RAN may transmit unicast reference timing signals associated with a unicast network timing reference to individual UEs. Starting in 3GPP Rel. 16, the RAN may transmit broadcast unicast reference timing signals associated with a broadcast network timing reference to multiple UEs. Transmission of the broadcast reference timing signals to N UEs (i.e., 1:N) consumes fewer resources (less overhead) relative to transmission of N unicast reference timing signals to those same N UEs (i.e., N:N).

For some UEs, clock synchronization based on unicast network timing reference is more accurate than clock synchronization based on broadcast network timing reference. For example, a UE near a cell edge is relatively far from the BS, such that there is increased propagation delay which adds to the error. For other UEs, clock synchronization based on unicast network timing reference is similar in terms of accuracy relative to clock synchronization based on broadcast network timing reference. For example, a UE very close to the BS may experience comparable accuracy between the respective clock synchronization schemes.

Conventionally, the RAN decides whether UEs are to use broadcast network timing reference or unicast network timing reference for clock synchronization based on overhead. For example, if the RAN is lightly loaded in a particular cell, the RAN may preferentially use unicast network timing reference for UEs in that cell. By contrast, if the RAN is highly loaded in a particular, the RAN may preferentially use broadcast network timing reference in that cell.

Aspects of the disclosure relate to various mechanisms to selectively trigger a transition at a UE between clock synchronization performed in accordance with a unicast network timing reference and clock synchronization in accordance with a broadcast network timing reference.

In an aspect of the disclosure, a method, a computer-readable medium, and an apparatus are provided. The apparatus may be a UE. The UE may perform clock synchronization in accordance with a first network timing reference, may detect one or more events associated with a connection between the UE and at least one base station, and may switch from the first network timing reference to a second network timing reference for clock synchronization in response to the one or more detected events.

In another aspect of the disclosure, a method, a computer-readable medium, and an apparatus are provided. The apparatus may be a communications device, such as a UE or a BS. The communications device may determine to transition a user equipment (UE) from a first network timing reference for clock synchronization to a second network timing reference for clock synchronization, and may perform one or more actions to facilitate the network timing reference transition.

In another aspect of the disclosure, a method, a computer-readable medium, and an apparatus are provided. The apparatus may be a base station. The base station may transmit information indicative of whether a UE is permitted to perform clock synchronization in accordance with a unicast network timing reference. The base station may further communicate with the UE based on the transmitted information.

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
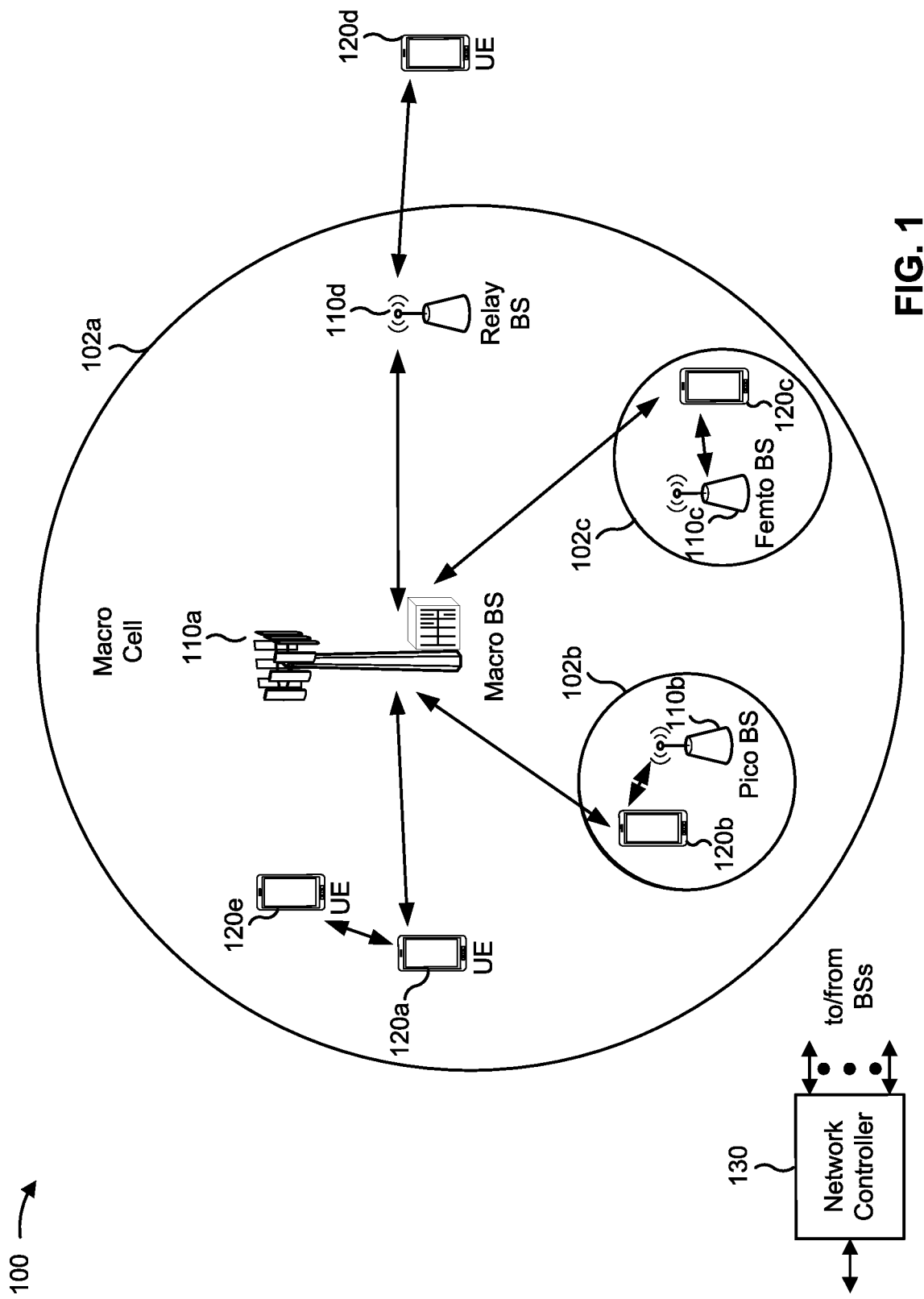
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
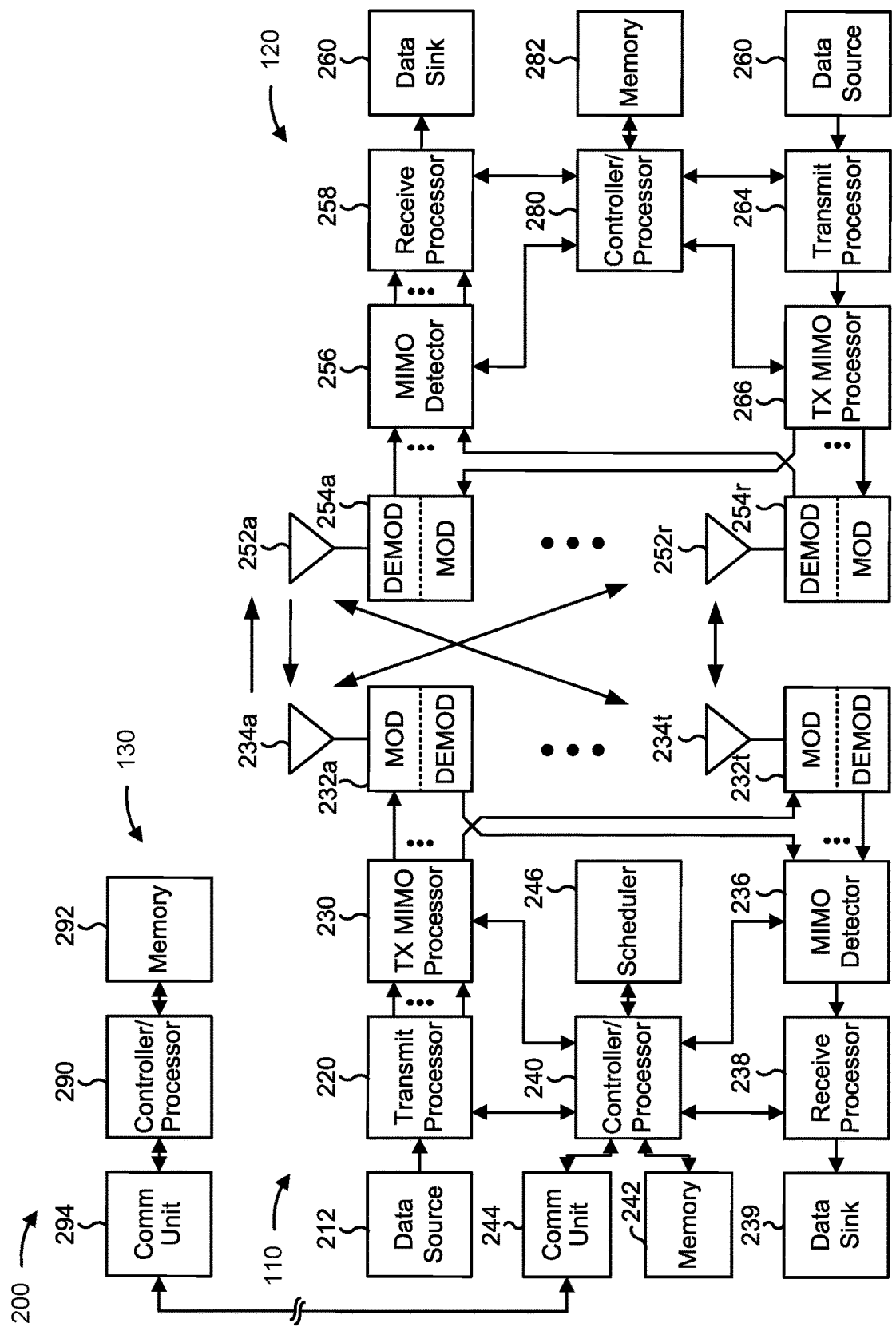
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of, for example, process 500 of FIG. 5 or process 600 of FIG. 6, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

In some systems, a UE may synchronize a local clock maintained at the UE with a network clock to facilitate end-to-end (e2e) clock synchronization. At the physical layer, base station(s) of a radio access network (RAN) may transmit reference timing signals which can be measured by the UE and used to perform the clock synchronization of its local clock. Various data traffic communications (e.g., generic Precision Time Protocol (gPTP) packets) may then be performed on a physical layer between the UE and the RAN based on the synchronized local clock.

In some systems, the RAN may transmit unicast reference timing signals associated with a unicast network timing reference to individual UEs. Starting in 3GPP Rel. 16, the RAN may transmit broadcast unicast reference timing signals associated with a broadcast network timing reference to multiple UEs. Transmission of the broadcast reference timing signals to N UEs (i.e., 1:N) consumes fewer resources (less overhead) relative to transmission of N unicast reference timing signals to those same N UEs (i.e., N:N).

Figure 3:
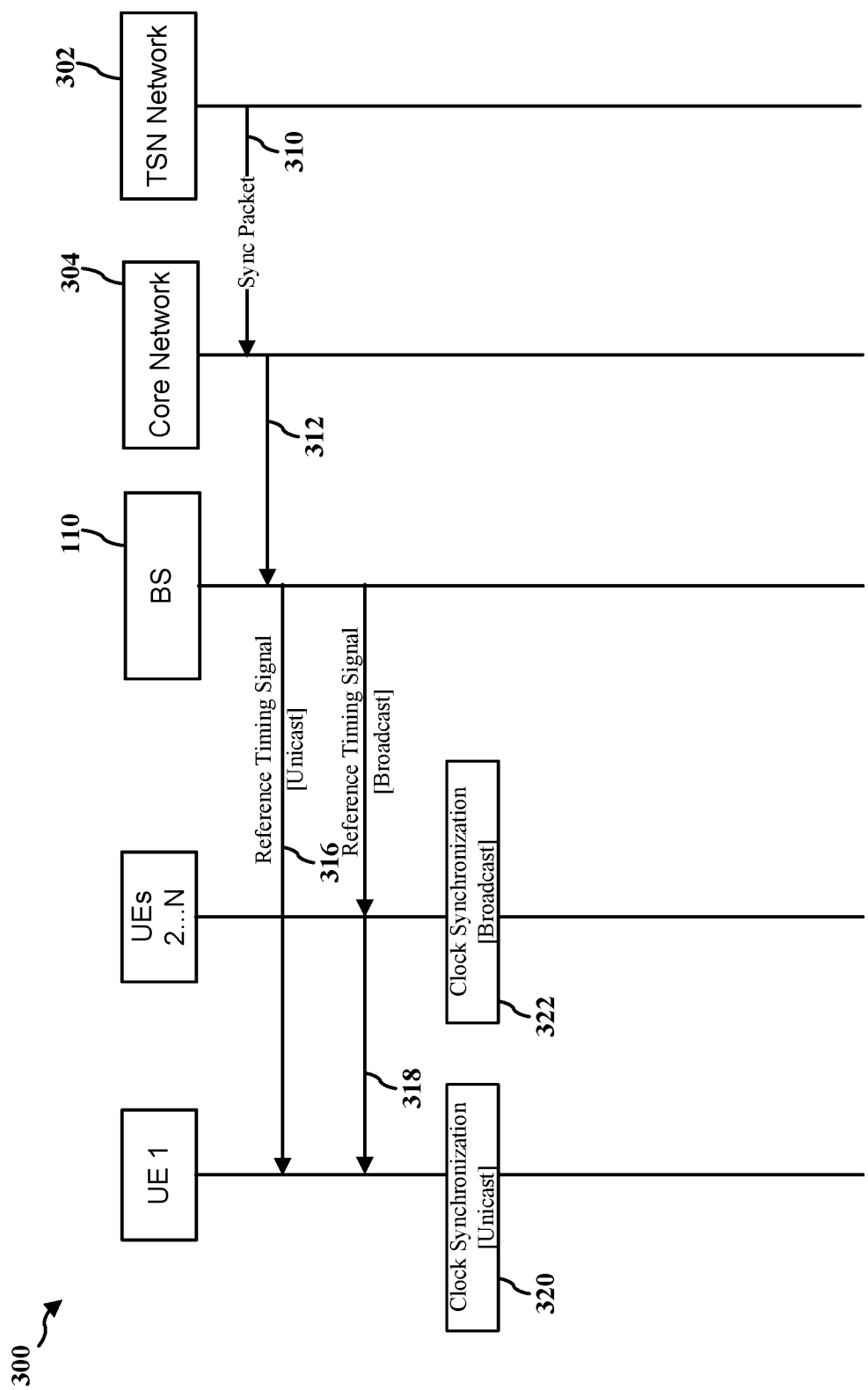
FIG. 3 illustrates a clock synchronization procedure in accordance with an aspect of the disclosure.

FIG. 3 illustrates a clock synchronization procedure 300 in accordance with an aspect of the disclosure.

Referring to FIG. 3, at 310, a Time-Sensitive Networking (TSN) network 302 may transmit a timing synchronization packet to a core network 304 of a 5G NR communications system, which is then signaled to BS 110, 312. For ensuring high synchronization accuracy, UE 1 may need to correct information in the timing synchronization packet based on the time spent by the timing synchronization packet between core network 304 and UE 1. To compute this time offset, UE 1 needs to be synchronized with the core network 304 (or a network function or node in the core network 304). In the process 300 of FIG. 3, this synchronization is realized by first having BS 110 and the core network 304 both synchronize to a common time called 5GS time. Then UE 1 can synchronize to the 5GS time if RAN node provides 5GS time to the UE. At 316, 5GS time is signaled to UE 1 via a unicast reference timing signal. At 318, 5GS time is signaled to UEs 2 . . . N via a broadcast reference timing signal. At 320, UE 1 performs clock synchronization based on the unicast reference timing signal from 316. At 322, UEs 2 . . . N each perform clock synchronization based on the broadcast reference timing signal from 318.

For some UEs, clock synchronization based on unicast network timing reference is more accurate than clock synchronization based on broadcast network timing reference. For example, a UE near a cell edge is relatively far from the BS, such that there is increased propagation delay which adds to the error. For other UEs, clock synchronization based on unicast network timing reference is similar in terms of accuracy relative to clock synchronization based on broadcast network timing reference. For example, a UE very close to the BS may experience comparable accuracy between the respective clock synchronization schemes.

Conventionally, the RAN decides whether UEs are to use broadcast network timing reference or unicast network timing reference for clock synchronization based on overhead. For example, if the RAN is lightly loaded in a particular cell, the RAN may preferentially use unicast network timing reference for UEs in that cell. By contrast, if the RAN is highly loaded in a particular, the RAN may preferentially use broadcast network timing reference in that cell.

Aspects of the disclosure relate to various mechanisms to selectively trigger a transition at a UE between clock synchronization performed in accordance with a unicast network timing reference and clock synchronization in accordance with a broadcast network timing reference.

Figure 4A:
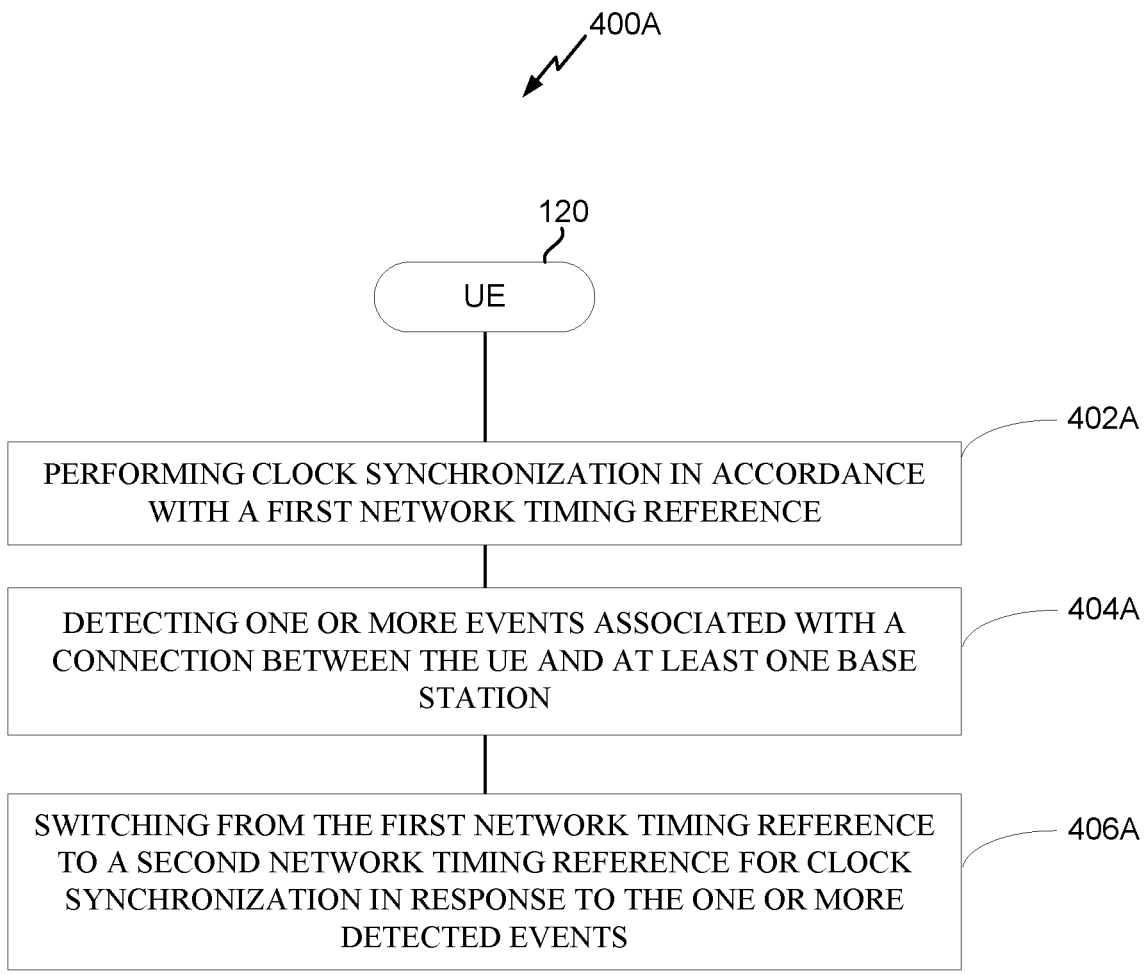
FIG. 4A illustrates an exemplary process of wireless communications according to an aspect of the disclosure.

FIG. 4A illustrates an exemplary process 400A of wireless communications according to an aspect of the disclosure. The process 400A of FIG. 4A is performed by UE 120.

At 402A, UE 120 (e.g., antenna(s) 252a . . . 252r, demodulators(s) 254a . . . 254r, MIMO detector 256, RX processor 258) performs clock synchronization in accordance with a first network timing reference. In some designs, the first network timing reference corresponds to a unicast network timing reference as will be described in more detail below with respect to FIG. 4B. In other designs, the first network timing reference corresponds to a broadcast network timing reference as will be described in more detail below with respect to FIG. 4C.

At 404A, UE 120 (e.g., controller/processor 280) detects one or more events associated with a connection between the UE and at least one base station (e.g., gNB, eNB or cell, a central unit (CU), a distributed unit (DU), etc.). In some designs, some events may trigger a unicast-to-broadcast network timing reference transition (e.g., see FIG. 4B), while other events may trigger a broadcast-to-unicast network timing reference transition (e.g., see FIG. 4C).

At 406A, UE 120 (e.g., antenna(s) 252a . . . 252r, demodulators(s) 254a . . . 254r, MIMO detector 256, RX processor 258) switches from the first network timing reference to a second network timing reference for clock synchronization in response to the one or more detected events. In an example, clock synchronization performed in accordance with the broadcast network timing reference comprises updating the clock maintained at the UE based upon one or more system information block (SIB) communications (e.g., SIB9 communications) that each map to a respective subframe that is at or immediately after an ending boundary of a system information (SI) window in which the respective SIB communication is transmitted.

Figure 4B:
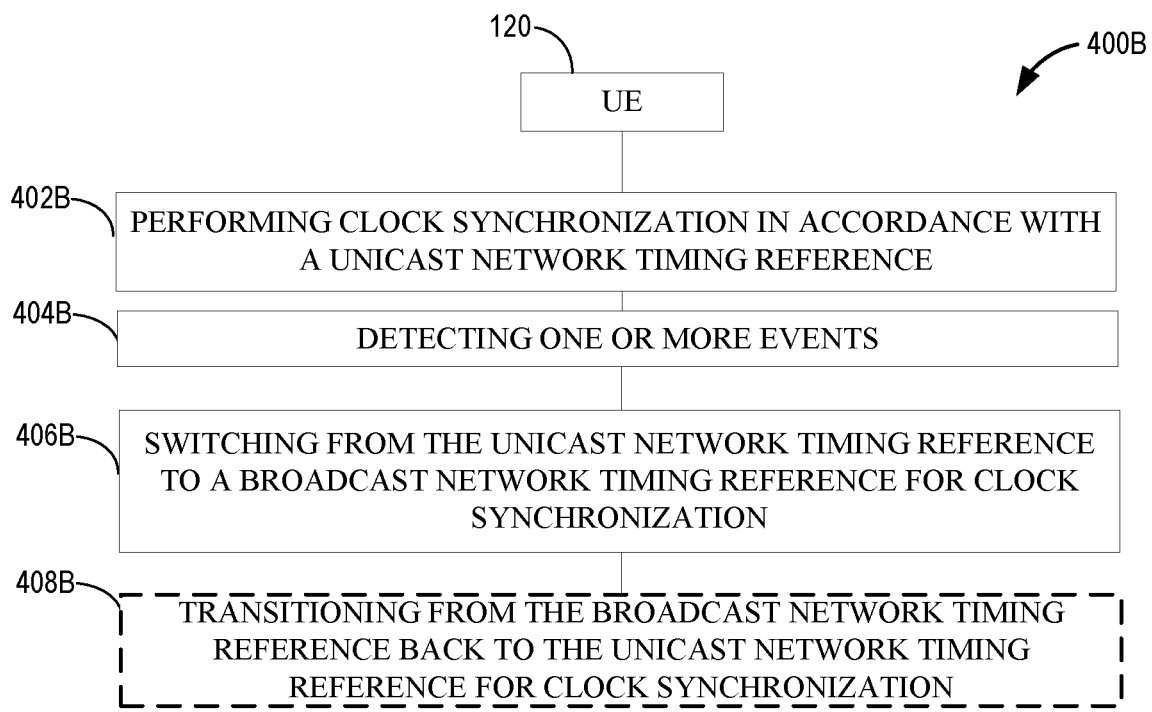
FIGS. 4B-4C illustrate example implementations of the process of FIG. 4A in accordance with aspects of the disclosure.

FIG. 4B illustrates an exemplary process 400B of wireless communications according to an aspect of the disclosure. The process 400B of FIG. 4B is performed by UE 120. In particular, the process 400B corresponds to an example implementation of the process 400A of FIG. 4A where the first network timing reference corresponds to a unicast network timing reference, and the second network timing reference corresponds to a broadcast network timing reference.

At 402B, UE 120 (e.g., antenna(s) 252a . . . 252r, demodulators(s) 254a . . . 254r, MIMO detector 256, RX processor 258) performs clock synchronization in accordance with a unicast network timing reference. For example, the clock synchronization performed in accordance with the unicast network timing reference comprises updating a clock maintained at the UE based on one or more unicast reference timing signals (e.g., one or more DLInformationTransfer communications), wherein each of the one or more unicast reference timing signals maps to a subframe boundary of a reference subframe (e.g., referenceSFN) that is nearest to a subframe in which the respective unicast reference timing signal is received. In some designs, one instance of the unicast reference timing signal may be sufficient for UE 120 to perform clock synchronization for a relatively long period of time based on frame structure tracking. For example, if a unicast reference timing signal indicates that time at a certain point (e.g., boundary of a symbol of a frame) denoted as 'p1' in frame structure is t1, time at another p2 in frame structure is t1 plus time between p2 and p1, wherein time between p2 and p1 is determined based on frame structure configuration (e.g., sub carrier spacing, frame duration, etc.). In an example, if p1 and p2 are a frame apart, t2=t1+10 ms, assuming frame duration=10 ms. In a further example, if p1 and p2 are one symbol apart, t2=t1+symbol duration, wherein symbol duration may be determined based on sub-carrier spacing.

At 404B, UE 120 (e.g., controller/processor 280) detects one or more events associated with a connection between the UE and at least one base station (e.g., gNB, eNB or cell, a central unit (CU), a distributed unit (DU), etc.). In an example, the one or more events may comprise a transition of the UE out of radio resource control (RRC)-Connected state (e.g., to an RRC-Idle or RRC-Inactive state) where UE 120 does not require precise timing for data traffic communications. In another example, the one or more events may comprise the UE moving (e.g., via a handoff or idle cell reselection procedure) to a new cell (e.g., of the same base station or a different base station) and/or to a new base station. However, in other designs, the UE moving to a new base station or new cell is not used as a trigger to the broadcast reference timing signal (e.g., a unicast reference timing signal may arrive more quickly than a broadcast reference timing signal post-handoff). In another example, the one or more events may comprise receipt of an indication from a new cell or new base station to which the UE has moved that indicates that the unicast network timing reference is not supported by the new cell and/or the new base station. In another example, the one or more events may comprise a fixed or dynamically configured threshold amount of time elapsing from receipt of a unicast reference timing signal associated with the unicast network timing reference. In another example, the one or more events may comprise receipt of a message from a base station that instructs the UE not to perform clock synchronization with the unicast network timing reference, which is described in more detail below with respect to FIG. 6. In another example, the one or more detected events may comprise a time differential associated with clock synchronization performed in accordance with the unicast network timing reference and the broadcast network timing reference exceeding a threshold (e.g., clock synchronization in accordance with unicast network timing reference may drift if implemented for extended periods using frame tracking). In an example, the time differential threshold may be at least about 1.0 s, although other time differential thresholds can be used in other designs. In another example, the one or more detected events may be associated with a distance between the UE and the at least one base station (e.g., a serving BS of the UE) and the UE. For example, if the UE is relatively close to the serving BS (e.g., less than threshold distance), then the broadcast network timing reference may be sufficient for clock synchronization. However, the broadcast network timing reference is sent to multiple UEs rather than being tailored to particular UEs in terms of power control, etc., and as such the UE may be switched to the unicast network timing reference if the UE moves too far away from the serving BS (e.g., beyond a distance threshold).

At 406B, UE 120 (e.g., antenna(s) 252a . . . 252r, demodulators(s) 254a . . . 254r, MIMO detector 256, RX processor 258) switches from the unicast network timing reference to a broadcast network timing reference for clock synchronization in response to the one or more detected events. In an example, clock synchronization performed in accordance with the broadcast network timing reference comprises updating the clock maintained at the UE based upon one or more system information block (SIB) communications (e.g., SIB9 communications) that each map to a respective subframe that is at or immediately after an ending boundary of a system information (SI) window in which the respective SIB communication is transmitted.

At 408B, UE 120 (e.g., antenna(s) 252a . . . 252r, demodulators(s) 254a . . . 254r, MIMO detector 256, RX processor 258) optionally transitions from the broadcast network timing reference back to the unicast network timing reference for clock synchronization. In an example, the optional transition at 408B may be UE-initiated (e.g., UE 120 transmits a unicast-transition request to its serving base station). In another example, the optional transition at 408B may be initiated by a base station (e.g., a serving base station of UE 120).

Figure 4C:
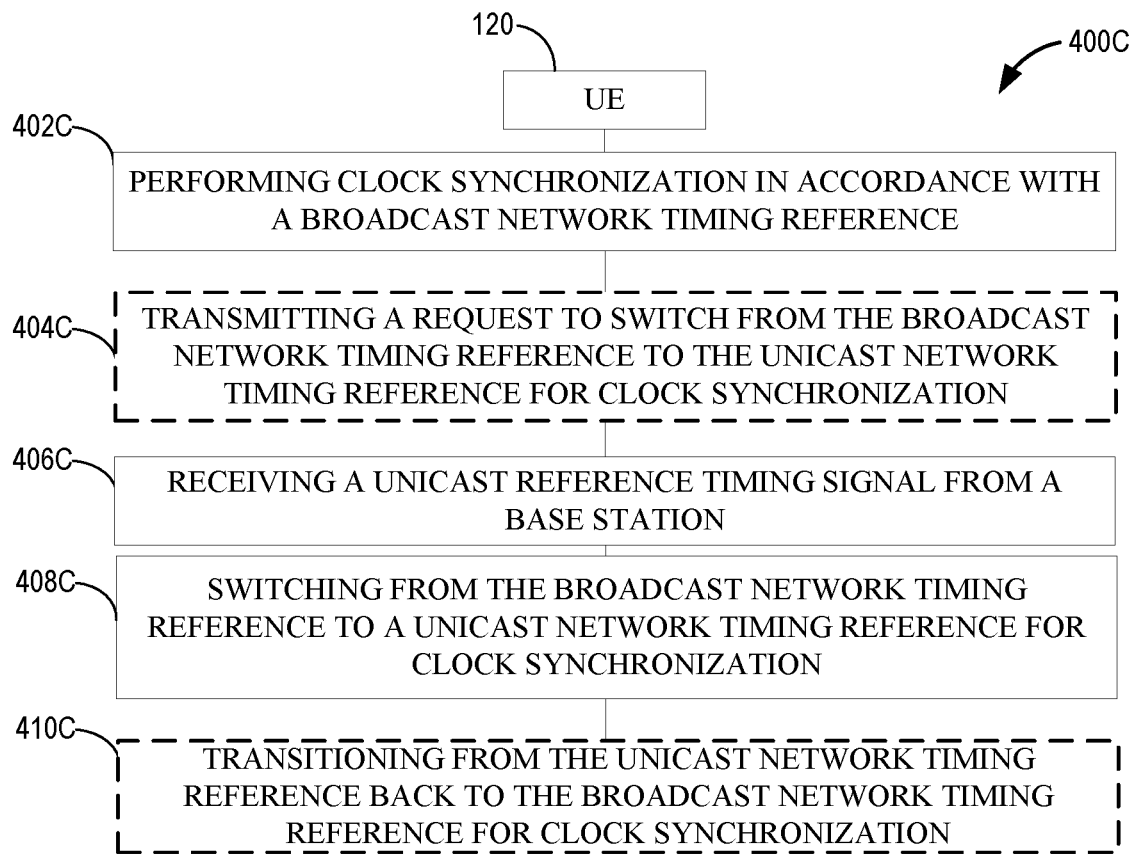

FIG. 4C illustrates an exemplary process 400C of wireless communications according to an aspect of the disclosure. The process 400C of FIG. 4C is performed by UE 120. In particular, the process 400C corresponds to an example implementation of the process 400A of FIG. 4A where the first network timing reference corresponds to a broadcast network timing reference, and the second network timing reference corresponds to a unicast network timing reference.

At 402C, UE 120 (e.g., antenna(s) 252a . . . 252r, demodulators(s) 254a . . . 254r, MIMO detector 256, RX processor 258) performs clock synchronization in accordance with a broadcast network timing reference. For example, the clock synchronization performed in accordance with the broadcast network timing reference comprises updating the clock maintained at the UE based upon one or more SIB communications (e.g., SIB9 communications) that each map to a respective subframe that is at or immediately after an ending boundary of a SI window in which the respective SIB communication is transmitted.

At 404C, UE 120 (e.g., antenna(s) 252a . . . 252r, TX MIMO processor 266, modulators(s) 254a . . . 254r, TX processor 264) optionally transmits, to a base station (e.g., a serving base station of UE 120), a request to switch from the broadcast network timing reference to the unicast network timing reference for clock synchronization. The optional transmission of 404C can be triggered in various ways (e.g., UE 120 transitions to RRC-Connected state, UE 120 moves near a cell-edge and the broadcast network timing reference loses accuracy, etc.).

At 406C, UE 120 (e.g., antenna(s) 252a . . . 252r, demodulators(s) 254a . . . 254r, MIMO detector 256, RX processor 258) receives a unicast reference timing signal from the base station. In an example, the unicast reference timing signal received at 406C may be responsive to the request optionally transmitted at 404C. In other designs, transmission of the unicast reference timing signal is triggered at the base station without a request from UE 120.

At 408C, UE 120 (e.g., antenna(s) 252a . . . 252r, demodulators(s) 254a . . . 254r, MIMO detector 256, RX processor 258) switches from the from the broadcast network timing reference to a unicast network timing reference for clock synchronization in response to receipt of the unicast reference timing signal. In an example, clock synchronization performed in accordance with the unicast network timing reference comprises updating a clock maintained at the UE based on one or more unicast reference timing signals, wherein each of the one or more unicast reference timing signals maps to a subframe boundary of a reference subframe that is nearest to a subframe in which the respective unicast reference timing signal is received.

At 410C, UE 120 (e.g., antenna(s) 252a . . . 252r, demodulators(s) 254a . . . 254r, MIMO detector 256, RX processor 258) optionally transitions from the unicast network timing reference back to the broadcast network timing reference for clock synchronization. In an example, the transition of 410C can be triggered by one or more of the events detected at 404B, in which case 410C corresponds to an example implementation of 406B of FIG. 4B.

Figure 5:
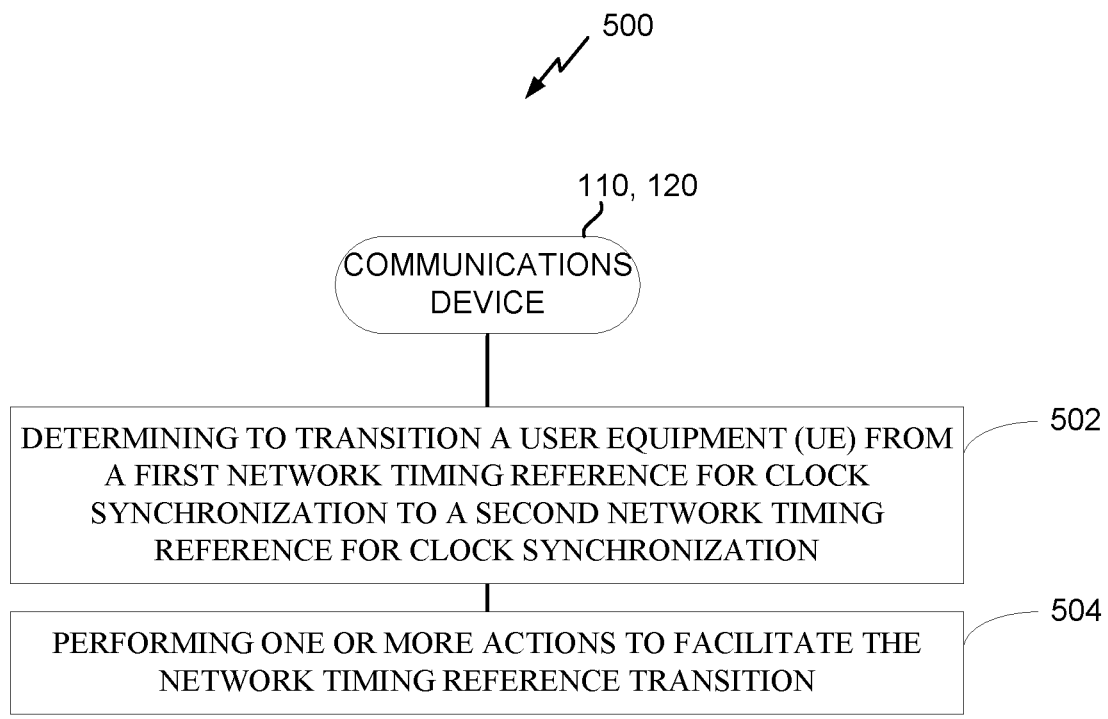
FIG. 5 illustrates an exemplary process of wireless communications according to an aspect of the disclosure.

FIG. 5 illustrates an exemplary process 500 of wireless communications according to an aspect of the disclosure. The process 500 of FIG. 5 is performed by a communications device. In some designs, the communications device corresponds to a UE such as UE 120. In other designs, the communications device corresponds to a base station such as BS 110. In some designs, the process 500 of FIG. 5 may be used to trigger the network timing reference switch described with respect to any of FIGS. 4A-4C.

At 502, the communications device (e.g., controller/processor 240, controller/processor 280, etc.) determines to transition a UE from a first network timing reference for clock synchronization to a second network timing reference for clock synchronization. In some designs, the first network timing reference corresponds to a unicast network timing reference (as in FIG. 4B). In other designs, the first network timing reference corresponds to a broadcast network timing reference (as in FIG. 4C). The determination at 502 can be made in various ways, as will be described below in more detail.

At 504, the communications device (e.g., controller/processor 240, controller/processor 280, antenna(s) 234*a* . . . 234*t* or 252*a* . . . 252*t*, modulators(s) 232*a* . . . 232*a*, TX MIMO processor 230 or 266, TX processor 220 or 264, etc.) performs one or more actions to facilitate the network timing reference transition. In an example where the communications device corresponds to the UE, the one or more actions may comprise transmitting, to a base station, a request to switch from the broadcast network timing reference to the unicast network timing reference for clock synchronization. In an example where the communications device corresponds to a base station, the one or more actions may comprise transmitting, to the UE, the unicast network timing reference for clock synchronization.

Referring to FIG. 5, the determination at 502 may be associated with the one or more detected events described above with respect to FIGS. 4A-4B (although such events could be detected at other entity types, such as BS 110, in context with FIG. 5). For example, the determination of 502 may be based on the UE handing off to a new cell that does not support the unicast network timing reference. In another example, the determination of 502 is based on a time differential associated with clock synchronization performed in accordance with the unicast network timing reference and the broadcast network timing reference exceeding a threshold.

Figure 6:
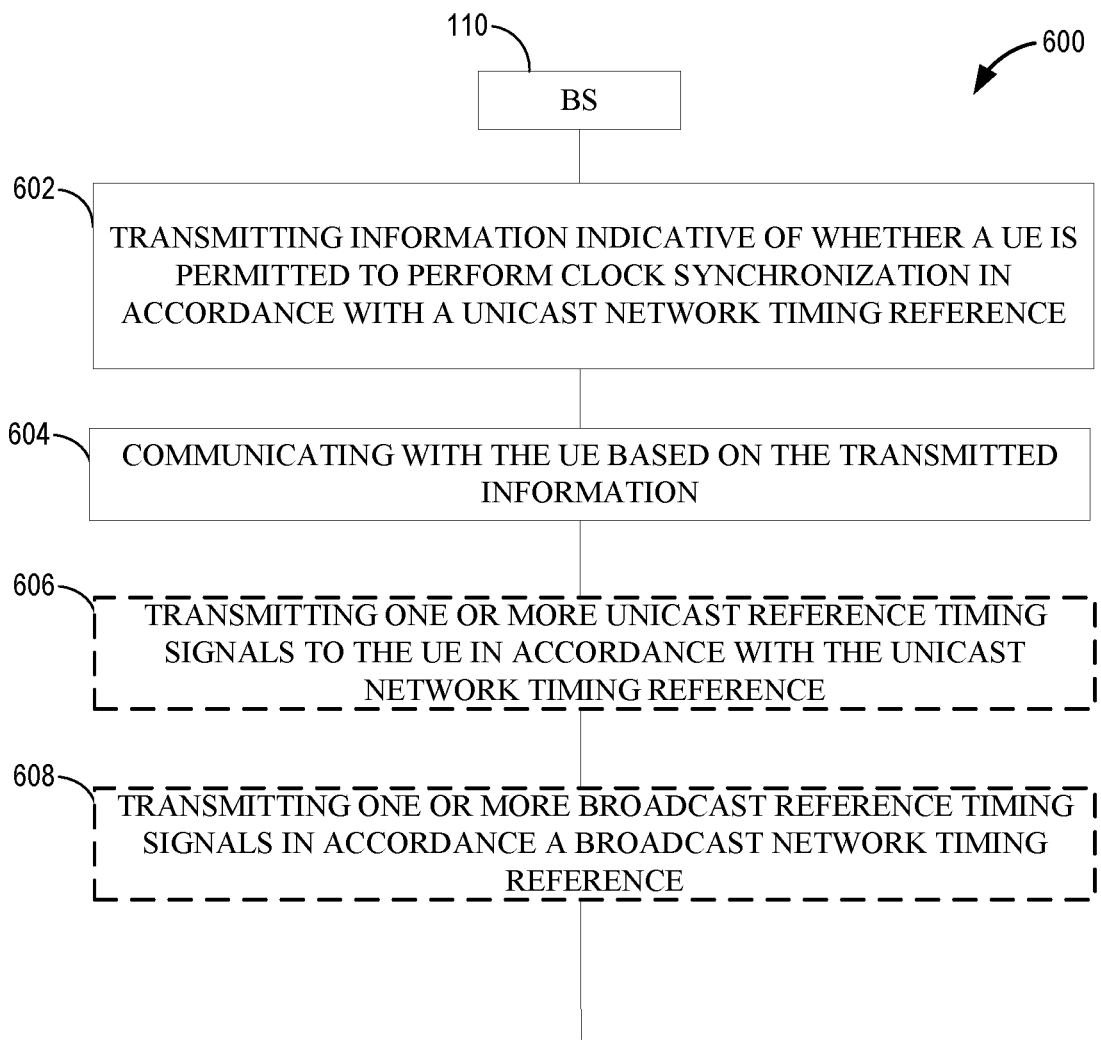
FIG. 6 illustrates an exemplary process of wireless communications according to an aspect of the disclosure.

FIG. 6 illustrates an exemplary process 600 of wireless communications according to an aspect of the disclosure. The process 600 of FIG. 6 is performed by BS 110.

At 602, BS 110 (e.g., antenna(s) 234*a* . . . 234*t*, modulators(s) 232*a* . . . 232*a*, TX MIMO processor 230, TX processor 220) transmits information indicative of whether a UE is permitted to perform clock synchronization in accordance with a unicast network timing reference. In an example, the information at 602 is transmitted via unicast and indicates that clock synchronization in accordance with the unicast network timing reference is not permitted by the UE (e.g., a UE-specific unicast-timing prohibition, for a low-priority UE, for a UE that moves close to the base station, etc.). In an alternative example, the information at 602 is transmitted via multicast and indicates that clock synchronization in accordance with a respective unicast network timing reference is not permitted by any UE in a group to which the UE belongs (e.g., a group-specific unicast-timing prohibition). In another alternative example, the information at 602 is transmitted via broadcast and indicates that clock synchronization in accordance with a respective unicast network timing reference is not permitted by any UE served by the base station (e.g., a cell-wide unicast-timing prohibition). In some designs, the information transmitted at 602 is based on the base station not supporting the unicast network timing reference at all. In other designs, the unicast network timing reference to the UE is supported by the base station but is not currently available (e.g., transmitted at 602 in response to either an overhead condition associated with the base station or a determination that the broadcast network timing reference is capable of providing sufficient accuracy). In an example, the information transmitted at 602 (e.g., RRC, DCI, MAC-CE, etc.) may be configured to notify that a UE that was previously provided with unicast network timing reference by BS 110 is no longer permitted to use the unicast network timing reference for clock synchronization and must switch to the broadcast network timing reference for clock synchronization.

At 604, BS 110 (e.g., antenna(s) 234*a* . . . 234*t*, modulators(s) 232*a* . . . 232*a*, TX MIMO processor 230, TX processor 220, demodulators(s) 232*a* . . . 232*a*, MIMO detector 236, RX processor 238) communicates with the UE based on the transmitted information. For example, the communication at 606 may comprise transport of gPTP packets that are exchanged based on a clock at the UE synchronized in accordance with either the unicast network timing reference (e.g., if permitted by base station as indicated in 604) or the broadcast network timing reference.

At 606, BS 110 (e.g., antenna(s) 234*a* . . . 234*t*, modulators(s) 232*a* . . . 232*a*, TX MIMO processor 230, TX processor 220) optionally transmits one or more unicast reference timing signals to the UE in accordance with the unicast network timing reference. In some designs, the optional transmission(s) at 606 may occur if the information transmitted at 604 indicates that clock synchronization in accordance with the unicast network timing reference is permitted by the UE. In an example, each of the one or more unicast reference timing signals maps to a subframe boundary of a reference subframe that is nearest to a subframe in which the respective unicast reference timing signal is received.

At 608, BS 110 (e.g., antenna(s) 234*a* . . . 234*t*, modulators(s) 232*a* . . . 232*a*, TX MIMO processor 230, TX processor 220) optionally transmits one or more broadcast reference timing signals in accordance with a broadcast network timing reference. In some designs, the broadcast network timing reference is transmitted at 608 in addition to is configured to be used as an alternative to the unicast network timing reference for clock synchronization by the UE. In an example, the one or more broadcast reference timing signals correspond to one or more SIB communications that each map to a respective subframe boundary that is at or immediately after an ending boundary of a SI window in which the respective SIB communication is transmitted.

Referring to FIGS. 4A-6, in some designs, the clock maintained at the UE for which clock synchronization is performed may be associated end-to-end timing synchronization for TSN, such as end-to-end synchronization between the UE (e.g., UE 120) and the TSN network 300 of FIG. 3.

Figure 7:
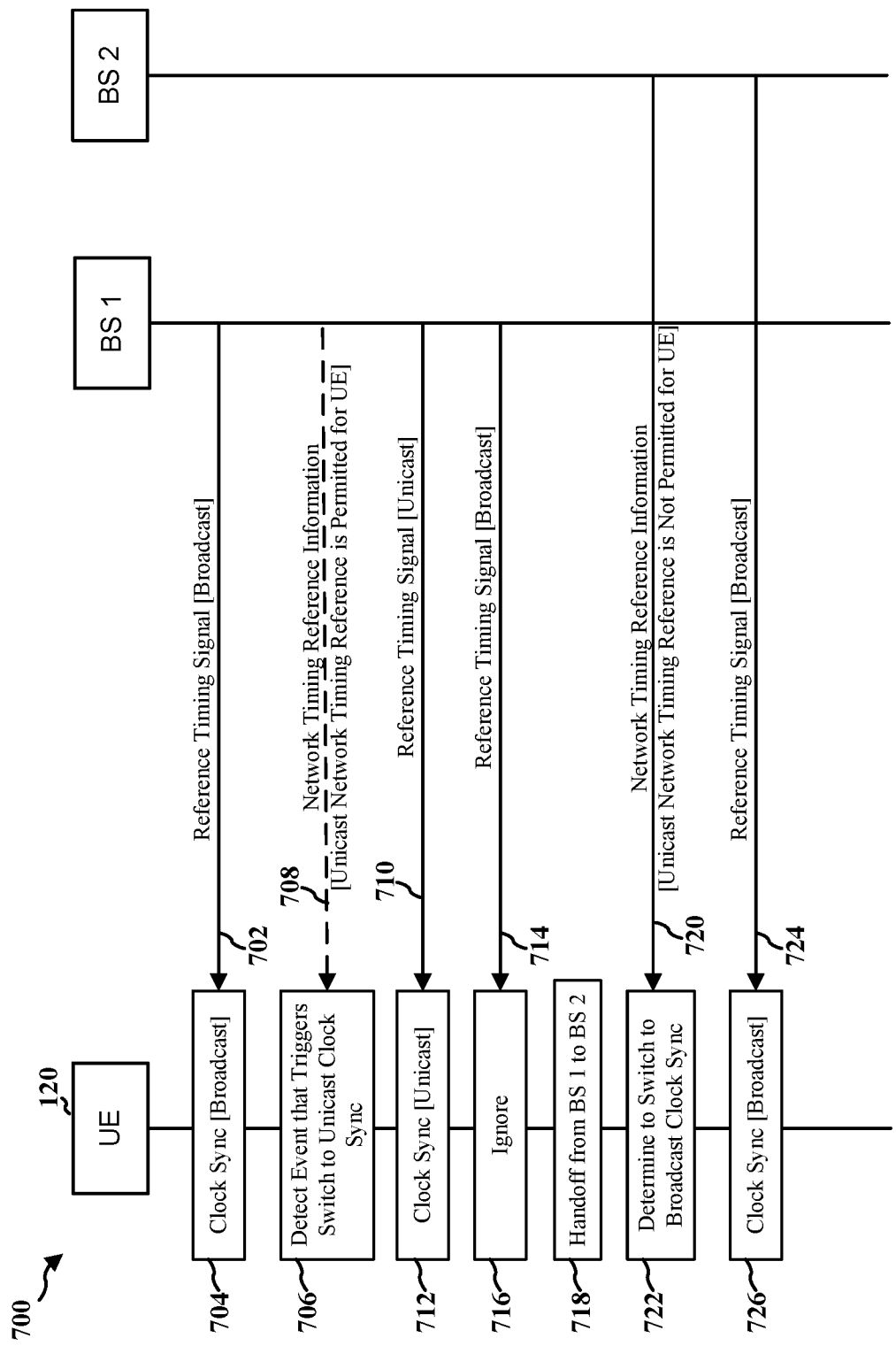
FIG. 7 illustrates an example implementation of the processes of FIGS. 4A-6 in accordance with an aspect of the disclosure.

FIG. 7 illustrates an example implementation 700 of the processes 400A-600 of FIGS. 4A-6 in accordance with an aspect of the disclosure. At 702 (e.g., as in 608 of FIG. 6), BS 1 transmits a broadcast reference timing signal (e.g., SIB9). At 704 (e.g., as in 402C of FIG. 4C), UE 120 performs clock synchronization based on the broadcast reference timing signal from 702. At 706 (e.g., as in 404B of FIG. 4B), UE 120 detects an event that triggers a switch from the broadcast reference timing signal for clock synchronization to the unicast reference timing signal for clock synchronization. In an example, the detected event at 706 may optionally be receipt of network timing reference information from BS 1 that indicates UE 120 is permitted to use the unicast reference timing signal for clock synchronization (e.g., removing a previous prohibition on using unicast network timing reference.

At 710 (e.g., as in 406C of FIG. 4C or 606 of FIG. 6), BS 1 transmits a unicast reference timing signal to UE 120. At 712 (e.g., as in 402C of FIG. 4C). At 712 (e.g., as in 402B of FIG. 4B or 408C of FIG. 4C), UE 120 performs clock synchronization based on the unicast reference timing signal from 710. At 714 (e.g., as in 608 of FIG. 6), BS 1 transmits a broadcast reference timing signal (e.g., SIB9). At 716, because UE 120 has already switched to the unicast network timing reference for clock synchronization, the broadcast reference timing signal at 714 is ignored by UE 120.

At 718, UE 120 hands off from BS 1 to BS 2. At 720 (e.g., as in 602 of FIG. 6), BS 2 transmits network timing reference information that indicates UE 120 is not permitted to use unicast network timing reference for clock synchronization. At 722 (e.g., as in 408B of FIG. 4B or 410C of FIG. 4C), UE 120 determines to switch to the broadcast network timing reference for clock synchronization based on the network timing reference information received at 720. At 724 (e.g., as in 608 of FIG. 6), BS 2 transmits a broadcast reference timing signal (e.g., SIB9). At 726 (e.g., as in 402C of FIG. 4C), UE 120 performs clock synchronization based on the broadcast reference timing signal from 724.

Figure 8:
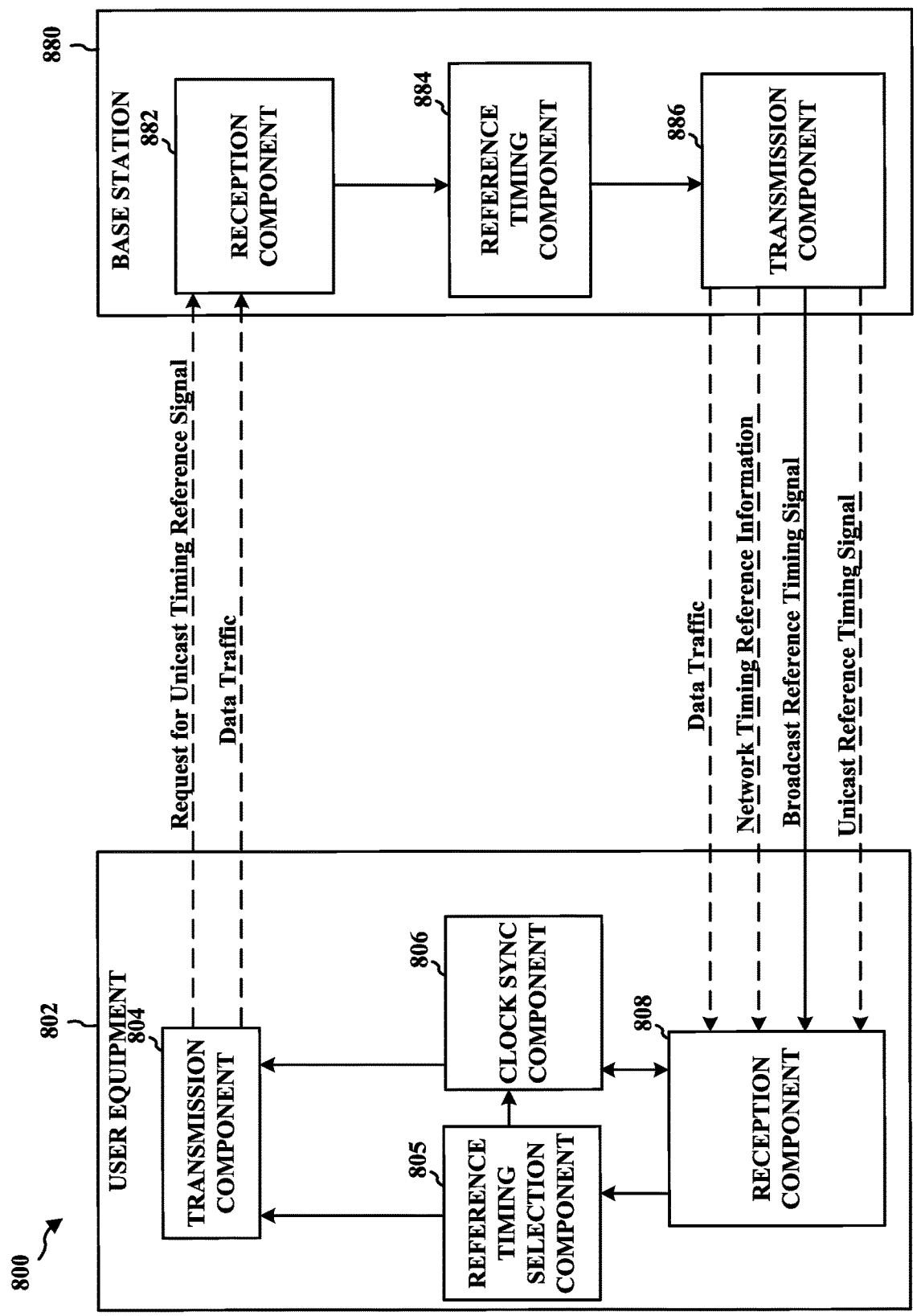
FIG. 8 is a conceptual data flow diagram illustrating data flow between different means/components according to an aspect of the disclosure.

FIG. 8 is a conceptual data flow diagram 800 illustrating the data flow between different means/components in exemplary apparatuses 802 and 880 in accordance with an aspect of the disclosure. The apparatus 802 may be a UE (e.g., UE 120) in communication with an apparatus 880, which may be a base station (e.g., base station 110).

The apparatus 802 includes a transmission component 804, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 802 further includes a reference timing selection component 805, which may correspond to processor circuitry in UE 120 as depicted in FIG. 2, including controller/processor 280, etc. The apparatus 802 further includes a clock synchronization component 806, which may correspond to processor circuitry in UE 120 as depicted in FIG. 2, including controller/processor 280, etc. The apparatus 802 further includes a reception component 808, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 880 includes a reception component 882, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 880 further optionally includes a reference timing component 884, which may correspond to processor circuitry in BS 110 as depicted in FIG. 2, including controller/processor 240. The apparatus 880 further includes a transmission component 886, which may correspond to transmission circuitry in BS 110 as depicted in FIG. 2, including e.g., controller/processor 240, antenna(s) 234a . . . 234r, modulators(s) 232a . . . 232r, Tx MIMO processor 230, TX processor 220, communication unit 244.

Referring to FIG. 8, the reference timing component 884 generates broadcast reference timing signal(s) and (optionally) generates unicast reference timing signal(s). The transmission component 886 transmits the broadcast reference timing signal(s) to the reception component 808 at apparatus 802. The transmission component 886 also optionally transmits the unicast reference timing signal(s) to the reception component 808 at apparatus 802. The transmission component 886 also transmits network timing reference to the reception component 808 at apparatus 802. The transmission component 886 also data traffic (e.g., gPTP packets) to the reception component 808 at apparatus 802 (e.g., if the apparatus 802 is RRC-Connected).

The reference timing selection component 805 selects either a unicast network reference timing or a broadcast network reference timing for clock synchronization (e.g., based on various factors, such as the optional network timing reference information, whether the optional unicast reference timing signal is received, etc.). In an example, if the reference timing selection component 805 selects the unicast network reference timing, this selection may trigger a request for a unicast timing reference signal. The clock synchronization component 806 performs clock selection in accordance with the selected network reference timing scheme. This clock synchronization may be used to synchronize various communications via the transmission component 804 and/or the reception component 808. The transmission component 804 optionally transmits the request for a unicast timing reference signal to the reception component 882. The transmission component 804 also optionally transmits the request for data traffic (e.g., gPTP packets) to the reception component 882. The reference timing component 884 may optionally approve/deny the optional request for unicast timing reference signal.

One or more components of the apparatus 802 and apparatus 880 may perform each of the blocks of the algorithm in the aforementioned flowcharts of FIGS. 4A-6. As such, each block in the aforementioned flowcharts of FIGS. 4A-6 may be performed by a component and the apparatus 802 and apparatus 880 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
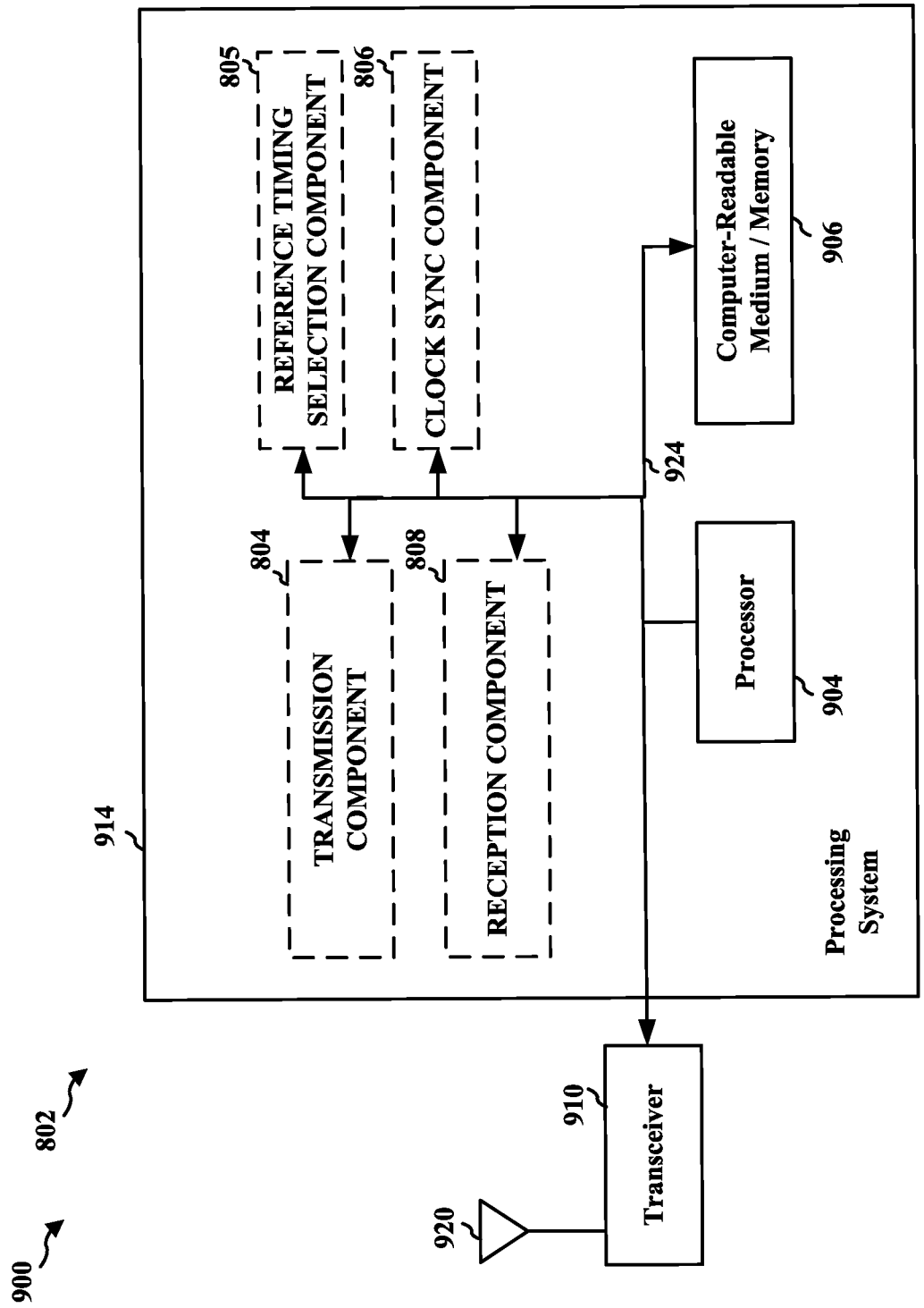
FIG. 9 is a diagram illustrating an example of a hardware implementation for an apparatus employing a processing system according to an aspect of the disclosure.

FIG. 9 is a diagram 900 illustrating an example of a hardware implementation for an apparatus 802 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 805, 806 and 808, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 808. In addition, the transceiver 910 receives information from the processing system 914, specifically the transmission component 804, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 805, 806 and 808. The components may be software components running in the processor 904, resident/stored in the computer readable medium/memory 906, one or more hardware components coupled to the processor 904, or some combination thereof. The processing system 914 may be a component of the UE 120 of FIG. 2 and may include the memory 282, and/or at least one of the TX processor 264, the RX processor 258, and the controller/processor 280.

In one configuration, the apparatus 802 (e.g., a UE) for wireless communication includes means for performing clock synchronization in accordance with a first network timing reference, means for detecting one or more events associated with a connection between the UE and at least one base station, and means for switching from the first network timing reference to a second network timing reference for clock synchronization in response to the one or more detected events. The aforementioned means may be one or more of the aforementioned components of the apparatus 802 and/or the processing system 914 of the apparatus 802 configured to perform the functions recited by the aforementioned means. As described supra, the processing system 914 may include the TX processor 264, the RX processor 258, and the controller/processor 280.

In another configuration, the apparatus 802 (e.g., a UE) for wireless communication includes means for performing clock synchronization in accordance with a unicast network timing reference, means for detecting one or more events associated with a connection between the UE and at least one base station, and means for switching from the unicast network timing reference to a broadcast network timing reference for clock synchronization in response to the one or more detected events. In some designs, the apparatus 802 may further include means for transitioning from the broadcast network timing reference back to the unicast network timing reference for clock synchronization. The aforementioned means may be one or more of the aforementioned components of the apparatus 802 and/or the processing system 914 of the apparatus 802 configured to perform the functions recited by the aforementioned means. As described supra, the processing system 914 may include the TX processor 264, the RX processor 258, and the controller/processor 280.

In another configuration, the apparatus 802 (e.g., a UE) for wireless communication includes means for performing clock synchronization in accordance with a broadcast network timing reference, means for receiving a unicast reference timing signal from a base station, and means for switching from the broadcast network timing reference to a unicast network timing reference for clock synchronization in response to receipt of the unicast reference timing signal. In some designs, the apparatus 802 may further include means for transmitting, to the base station, a request to switch from the broadcast network timing reference to the unicast network timing reference for clock synchronization, wherein the unicast reference timing signal is received in response to the transmitted request. In some designs, the apparatus 802 may further include means for transitioning from the unicast network timing reference back to the broadcast network timing reference for clock synchronization. The aforementioned means may be one or more of the aforementioned components of the apparatus 802 and/or the processing system 914 of the apparatus 802 configured to perform the functions recited by the aforementioned means. As described supra, the processing system 914 may include the TX processor 264, the RX processor 258, and the controller/processor 280.

Figure 10:
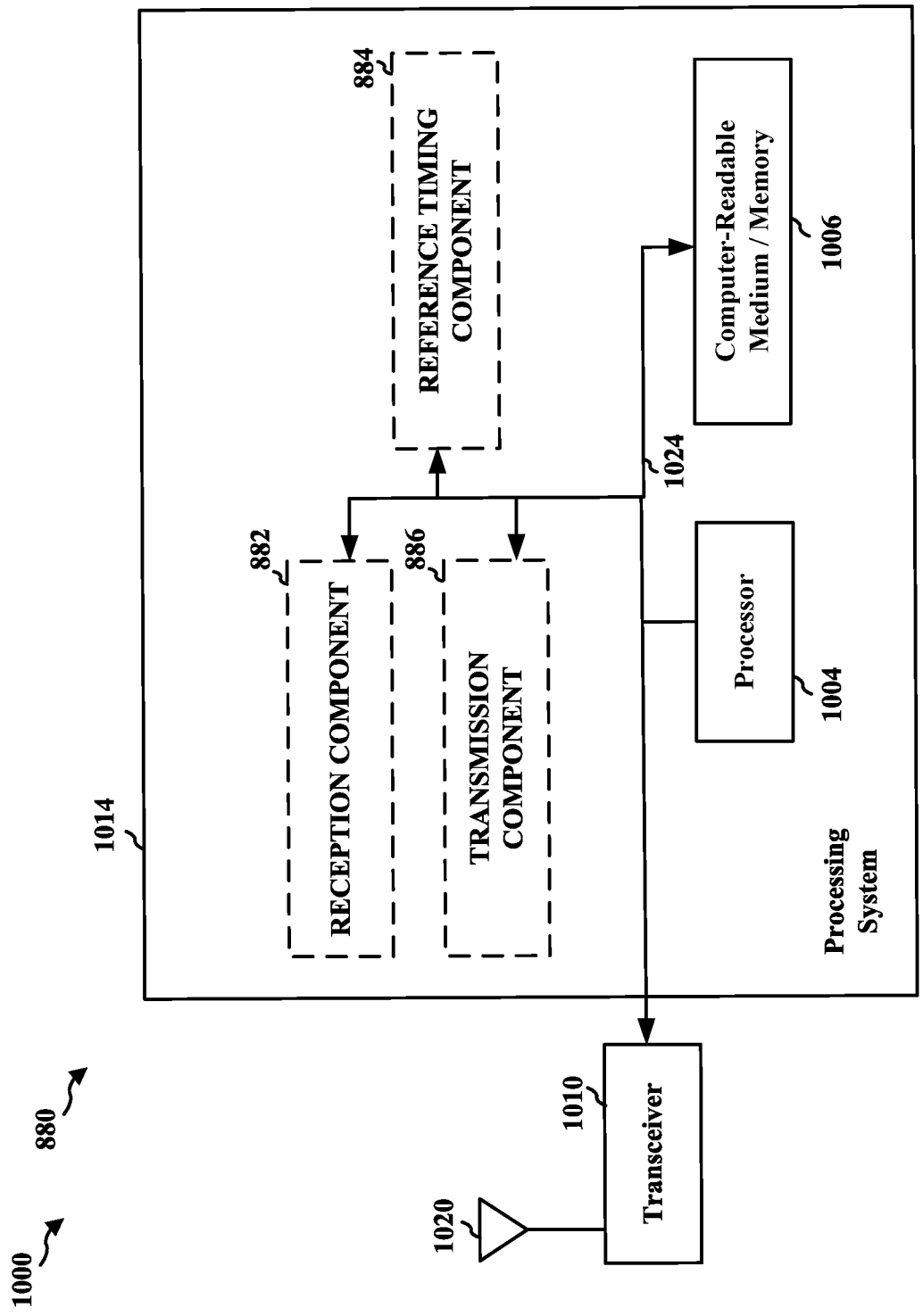
FIG. 10 is a diagram illustrating an example of a hardware implementation for an apparatus employing a processing system according to another aspect of the disclosure.

FIG. 10 is a diagram 1000 illustrating an example of a hardware implementation for an apparatus 880 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 882, 884 and 886, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 882. In addition, the transceiver 1010 receives information from the processing system 1014, specifically the transmission component 886, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 882, 884 and 886. The components may be software components running in the processor 1004, resident/stored in the computer readable medium/memory 1006, one or more hardware components coupled to the processor 1004, or some combination thereof. The processing system 1014 may be a component of the BS 110 of FIG. 2 and may include the memory 242, and/or at least one of the TX processor 220, the RX processor 238, and the controller/processor 240.

In one configuration, the apparatus 880 (e.g., a BS) for wireless communication includes means for transmitting information indicative of whether a UE is permitted to perform clock synchronization in accordance with a unicast network timing reference, and means for communicating with the UE based on the transmitted information. In some designs, the apparatus 880 may further include means for transmitting one or more unicast reference timing signals to the UE in accordance with the unicast network timing reference. The aforementioned means may be one or more of the aforementioned components of the apparatus 880 and/or the processing system 1014 of the apparatus 880 configured to perform the functions recited by the aforementioned means. As described supra, the processing system 1014 may include the TX processor 220, the RX processor 238, and the controller/processor 240.

In one configuration, a communications device (e.g., apparatus 802 or UE, or apparatus 880 or BS) for wireless communication includes determining to transition a user equipment (UE) from a first network timing reference for clock synchronization to a second network timing reference for clock synchronization, and means for performing one or more actions to facilitate the network timing reference transition.

Process 400A may include additional aspects, such as any single aspect or any combination of aspects described below and/or in connection with one or more other processes described elsewhere herein.

In a first aspect, the first network timing reference corresponds to a unicast network timing reference, and wherein the second network timing reference corresponds to a broadcast network timing reference.

In a second aspect, alone or in combination with the first aspect, the one or more detected events comprise a transition of the UE out of radio resource control (RRC)-Connected state.

In a third aspect, alone or in combination with one or more of the first and second aspects, the one or more detected events comprise the UE moving to a new cell.

In a fourth aspect, alone or in combination with one or more of the first through third aspects, the one or more detected events comprise receipt of an indication from a new cell to which the UE has moved that indicates that the unicast network timing reference is not supported by the new cell.

In a fifth aspect, alone or in combination with one or more of the first through fourth aspects, the one or more detected events comprise a fixed or dynamically configured threshold amount of time elapsing from receipt of a unicast reference timing signal associated with the unicast network timing reference.

In a sixth aspect, alone or in combination with one or more of the first through fifth aspects, the one or more detected events comprise receipt of a message from a base station that instructs the UE not to perform clock synchronization with the unicast network timing reference.

In a seventh aspect, alone or in combination with one or more of the first through sixth aspects, the one or more detected events comprise a time differential associated with clock synchronization performed in accordance with the unicast network timing reference and the broadcast network timing reference exceeding a threshold.

In an eighth aspect, alone or in combination with one or more of the first through seventh aspects, the one or more detected events is associated with a distance between the UE and the at least one base station.

In a ninth aspect, alone or in combination with one or more of the first through eighth aspects, process 400A includes transitioning from the broadcast network timing reference back to the unicast network timing reference for clock synchronization.

In a tenth aspect, alone or in combination with one or more of the first through ninth aspects, the transition is initiated by the UE, or wherein the transition is initiated by a base station.

In an eleventh aspect, alone or in combination with one or more of the first through tenth aspects, clocking synchronization performed in accordance with the unicast network timing reference comprises updating a clock maintained at the UE based on one or more unicast reference timing signals, wherein each of the one or more unicast reference timing signals maps to a subframe boundary of a reference subframe that is nearest to a subframe in which the respective unicast reference timing signal is received, and wherein clock synchronization performed in accordance with the broadcast network timing reference comprises updating the clock maintained at the UE based upon one or more system information block (SIB) communications that each map to a respective subframe that is at or immediately after an ending boundary of a system information (SI) window in which the respective SIB communication is transmitted.

In a twelfth aspect, alone or in combination with one or more of the first through eleventh aspects, the clock maintained at the UE is associated with end-to-end timing synchronization for time sensitive networking (TSN).

In a thirteenth aspect, alone or in combination with one or more of the first through twelfth aspects, the first network timing reference corresponds to a broadcast network timing reference, and wherein the second network timing reference corresponds to a unicast network timing reference.

In a fourteenth aspect, alone or in combination with one or more of the first through thirteenth aspects, the one or more detected events comprises receiving a unicast reference timing signal from a given base station.

In a fifteenth aspect, alone or in combination with one or more of the first through fourteenth aspects, process 400A includes transmitting, to the given base station, a request to switch from the broadcast network timing reference to the unicast network timing reference for clock synchronization, wherein the unicast reference timing signal is received in response to the transmitted request.

In a sixteenth aspect, alone or in combination with one or more of the first through fifteenth aspects, transmission of the unicast reference timing signal is triggered at a given base station without a request from the UE.

In a seventeenth aspect, alone or in combination with one or more of the first through sixteenth aspects, process 400A includes transitioning from the unicast network timing reference back to the broadcast network timing reference for clock synchronization.

In an eighteenth aspect, alone or in combination with one or more of the first through seventeenth aspects, clocking synchronization performed in accordance with the unicast network timing reference comprises updating a clock maintained at the UE based on one or more unicast reference timing signals, wherein each of the one or more unicast reference timing signals maps to a subframe boundary of a reference subframe that is nearest to a subframe in which the respective unicast reference timing signal is received, and wherein clock synchronization performed in accordance with the broadcast network timing reference comprises updating the clock maintained at the UE based upon one or more system information block (SIB) communications that each map to a respective subframe that is at or immediately after an ending boundary of a system information (SI) window in which the respective SIB communication is transmitted.

In a nineteenth aspect, alone or in combination with one or more of the first through eighteenth aspects, the clock maintained at the UE is associated with end-to-end timing synchronization for time sensitive networking (TSN).

Although FIG. 4A shows example blocks of process 400A, in some aspects, process 400A may include additional blocks, fewer blocks, different blocks, or differently arranged blocks than those depicted in FIG. 4A. Additionally, or alternatively, two or more of the blocks of process 400A may be performed in parallel.

Process 500 may include additional aspects, such as any single aspect or any combination of aspects described below and/or in connection with one or more other processes described elsewhere herein.

In a first aspect, the communications device corresponds to the UE, or wherein the communications device corresponds to a base station.

In a second aspect, alone or in combination with the first aspect, the first network timing reference corresponds to a unicast network timing reference, and wherein the second network timing reference corresponds to a broadcast network timing reference.

In a third aspect, alone or in combination with one or more of the first and second aspects, the determination is based on the UE handing off to a new cell that does not support the unicast network timing reference.

In a fourth aspect, alone or in combination with one or more of the first through third aspects, the determination is based on a time differential associated with clock synchronization performed in accordance with the unicast network timing reference and the broadcast network timing reference exceeding a threshold.

In a fifth aspect, alone or in combination with one or more of the first through fourth aspects, the first network timing reference corresponds to a broadcast network timing reference, and wherein the second network timing reference corresponds to a unicast network timing reference.

In a sixth aspect, alone or in combination with one or more of the first through fifth aspects, the communications device corresponds to the UE, and the one or more actions comprise transmitting, to a base station, a request to switch from the broadcast network timing reference to the unicast network timing reference for clock synchronization.

In a seventh aspect, alone or in combination with one or more of the first through sixth aspects, the communications device corresponds to a base station, and the one or more actions comprise transmitting, to the UE, the unicast network timing reference for clock synchronization.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a user equipment (UE), comprising:
    performing clock synchronization in accordance with a first network timing reference;
    detecting one or more events associated with a connection between the UE and at least one base station; and
    switching from the first network timing reference to a second network timing reference for clock synchronization in response to the one or more detected events,
    wherein the first network timing reference corresponds to a unicast network timing reference, and the second network timing reference corresponds to a broadcast network timing reference, or
    wherein the first network timing reference corresponds to the broadcast network timing reference, and the second network timing reference corresponds to the unicast network timing reference.

2. The method of claim 1,
    wherein the first network timing reference corresponds to the unicast network timing reference, and
    wherein the second network timing reference corresponds to the broadcast network timing reference.

3. The method of claim 2, wherein the one or more detected events comprise a transition of the UE out of radio resource control (RRC)-Connected state.

4. The method of claim 2, wherein the one or more detected events comprise the UE moving to a new cell.

5. The method of claim 4, wherein the one or more detected events comprise receipt of an indication from a new cell to which the UE has moved that indicates that the unicast network timing reference is not supported by the new cell.

6. The method of claim 2, wherein the one or more detected events comprise a fixed or dynamically configured threshold amount of time elapsing from receipt of a unicast reference timing signal associated with the unicast network timing reference.

7. The method of claim 2, wherein the one or more detected events comprise receipt of a message from a base station that instructs the UE not to perform clock synchronization with the unicast network timing reference.

8. The method of claim 2, wherein the one or more detected events comprise a time differential associated with clock synchronization performed in accordance with the unicast network timing reference and the broadcast network timing reference exceeding a threshold.

9. The method of claim 2, wherein the one or more detected events is associated with a distance between the UE and the at least one base station.

10. The method of claim 2, further comprising:
transitioning from the broadcast network timing reference back to the unicast network timing reference for clock synchronization.

11. The method of claim 10,
wherein the transition is initiated by the UE, or
wherein the transition is initiated by a base station.

12. The method of claim 2,
wherein clock synchronization performed in accordance with the unicast network timing reference comprises updating a clock maintained at the UE based on one or more unicast reference timing signals, wherein each of the one or more unicast reference timing signals maps to a subframe boundary of a reference subframe that is nearest to a subframe in which the respective unicast reference timing signal is received, and
wherein clock synchronization performed in accordance with the broadcast network timing reference comprises updating the clock maintained at the UE based upon one or more system information block (SIB) communications that each map to a respective subframe that is at or immediately after an ending boundary of a system information (SI) window in which the respective SIB communication is transmitted.

13. The method of claim 12, wherein the clock maintained at the UE is associated with end-to-end timing synchronization for time sensitive networking (TSN).

14. The method of claim 1,
wherein the first network timing reference corresponds to the broadcast network timing reference, and
wherein the second network timing reference corresponds to the unicast network timing reference.

15. The method of claim 14, wherein the one or more detected events comprises receiving a unicast reference timing signal from a given base station.

16. The method of claim 15, further comprising:
transmitting, to the given base station, a request to switch from the broadcast network timing reference to the unicast network timing reference for clock synchronization,
wherein the unicast reference timing signal is received in response to the transmitted request.

17. The method of claim 14, wherein transmission of the unicast reference timing signal is triggered at a given base station without a request from the UE.

18. The method of claim 14, further comprising:
transitioning from the unicast network timing reference back to the broadcast network timing reference for clock synchronization.

19. The method of claim 18,
wherein clock synchronization performed in accordance with the unicast network timing reference comprises updating a clock maintained at the UE based on one or more unicast reference timing signals, wherein each of the one or more unicast reference timing signals maps to a subframe boundary of a reference subframe that is nearest to a subframe in which the respective unicast reference timing signal is received, and
wherein clock synchronization performed in accordance with the broadcast network timing reference comprises updating the clock maintained at the UE based upon one or more system information block (SIB) communications that each map to a respective subframe that is at or immediately after an ending boundary of a system information (SI) window in which the respective SIB communication is transmitted.

20. The method of claim 19, wherein the clock maintained at the UE is associated with end-to-end timing synchronization for time sensitive networking (TSN).

21. A method of operating a communications device, comprising:
determining to transition a user equipment (UE) from a first network timing reference for clock synchronization to a second network timing reference for clock synchronization; and
performing one or more actions to facilitate the network timing reference transition,
wherein the first network timing reference corresponds to a unicast network timing reference, and the second network timing reference corresponds to a broadcast network timing reference, or
wherein the first network timing reference corresponds to the broadcast network timing reference, and the second network timing reference corresponds to the unicast network timing reference.

22. The method of claim 21,
wherein the communications device corresponds to the UE, or
wherein the communications device corresponds to a base station.

23. The method of claim 21,
wherein the first network timing reference corresponds to the unicast network timing reference, and
wherein the second network timing reference corresponds to the broadcast network timing reference.

24. The method of claim 23, wherein the determination is based on the UE handing off to a new cell that does not support the unicast network timing reference.

25. The method of claim 23, wherein the determination is based on a time differential associated with clock synchronization performed in accordance with the unicast network timing reference and the broadcast network timing reference exceeding a threshold.

26. The method of claim 21,
wherein the first network timing reference corresponds to the broadcast network timing reference, and
wherein the second network timing reference corresponds to the unicast network timing reference.

27. The method of claim 26, wherein the communications device corresponds to the UE, and the one or more actions comprise transmitting, to a base station, a request to switch from the broadcast network timing reference to the unicast network timing reference for clock synchronization.

28. The method of claim 26, wherein the communications device corresponds to a base station, and the one or more actions comprise transmitting, to the UE, the unicast network timing reference for clock synchronization.

29. A user equipment (UE), comprising:
a memory; and
at least one processor coupled to the memory and configured to:
perform clock synchronization in accordance with a first network timing reference;
detect one or more events associated with a connection between the UE and at least one base station; and switch from the first network timing reference to a second network timing reference for clock synchronization in response to the one or more detected events, wherein the first network timing reference corresponds to a unicast network timing reference, and the second network timing reference corresponds to a broadcast network timing reference, or wherein the first network timing reference corresponds to the broadcast network timing reference, and the second network timing reference corresponds to the unicast network timing reference.

30. A communications device, comprising:

a memory; and at least one processor coupled to the memory and configured to:

determine to transition a user equipment (UE) from a first network timing reference for clock synchronization to a second network timing reference for clock synchronization; and perform one or more actions to facilitate the network timing reference transition, wherein the first network timing reference corresponds to a unicast network timing reference, and the second network timing reference corresponds to a broadcast network timing reference, or wherein the first network timing reference corresponds to the broadcast network timing reference, and the second network timing reference corresponds to the unicast network timing reference.

* * * * *